(12) United States Patent
Klein

(10) Patent No.: US 6,950,060 B1
(45) Date of Patent: Sep. 27, 2005

(54) SATELLITE POSITIONING SYSTEM

(75) Inventor: Dale W. Klein, Middlesex, VT (US)

(73) Assignee: General Dynamics C4 Systems, Inc., Gilbert, AZ (US)

( * ) Notice: Subject to any disclaimer, the term of this patent is extended or adjusted under 35 U.S.C. 154(b) by 0 days.

(21) Appl. No.: 10/271,932

(22) Filed: Oct. 15, 2002

(51) Int. Cl.$^7$ .............................................. H04B 7/185
(52) U.S. Cl. ...................... 342/358; 455/12.1; 701/226
(58) Field of Search .......................... 342/357.06, 358; 244/158 R; 455/12.1; 701/226, 224

(56) References Cited

U.S. PATENT DOCUMENTS

| | | | |
|---|---|---|---|
| 4,375,697 A | | 3/1983 | Visher |
| 4,472,720 A | | 9/1984 | Reesor |
| 4,599,620 A | | 7/1986 | Evans |
| 4,602,257 A | | 7/1986 | Grisham |
| 4,843,397 A | | 6/1989 | Galati et al. |
| 5,490,076 A | * | 2/1996 | Rawicz et al. ................. 455/98 |
| 5,810,297 A | * | 9/1998 | Basuthakur et al. ........ 244/176 |
| 5,877,725 A | | 3/1999 | Kalafus |
| 5,979,830 A | * | 11/1999 | Kellermeier ............ 244/158 R |
| 5,995,040 A | | 11/1999 | Issler et al. |
| 6,002,360 A | | 12/1999 | Wolcott et al. |
| 6,169,957 B1 | | 1/2001 | Arethens |
| 6,215,776 B1 | | 4/2001 | Chao |
| 6,219,617 B1 | | 4/2001 | Dreischer et al. |
| 6,553,286 B2 | * | 4/2003 | Turner et al. ................... 701/13 |
| 6,560,534 B2 | * | 5/2003 | Abraham et al. ........... 701/213 |

OTHER PUBLICATIONS

Martin-Mu, Tomas, et al, "Use of GPS for Precise and Operational Orbit Determination at ECOS," ION GPS '95, nng.esoc.esa.de/GPS/refs/ION_95.pdf, pp. 1-8.*

Fisher, Stephen, "GPS IIF —The Next Generation," Proceedings of the IEEE, vol. 87, No. 1, Jan. 1999, pp. 24-47.*

* cited by examiner

*Primary Examiner*—Gregory C. Issing
(74) *Attorney, Agent, or Firm*—Schmeiser Olsen & Watts, LLP

(57) ABSTRACT

A satellite positioning system and method of maintaining the positioning and clock data of a satellite using as few as one or two monitoring stations is disclosed. Each satellite of the positioning system determines its own positioning and clock data relative to other satellites in a constellation. One or more satellite signal monitoring stations receive relative clock and positioning data from a plurality of satellites in the constellation. A constellation solution which is applicable to all of the satellites in the constellation is calculated by treating the constellation as a rigid body at a fixed point in time. The constellation solution is transmitted to a satellite of the constellation which disseminates the solution through a crosslink network within the constellation for use by each satellite to update its individual positioning and clock data as needed. Due to the stability of the position and clock measurements using the method of the present invention, satellite uploads need only occur for one satellite in a constellation once each two or more days rather than every day for every satellite as is conventionally done. The use of mobile monitoring stations and the capacity of the positioning system to assist in updating the position and clock data of satellites passing the constellation are disclosed. In particular embodiments of the invention, the satellite positioning system is configured as a global positioning system (GPS).

42 Claims, 14 Drawing Sheets (Convetional GPS Orbits)

Monitor Station Separation Angles (deg)

| | Vandenburg | Hawaii | Cape Canaveral | Ascension | Diego Garcia | Kwajalein |
|---|---|---|---|---|---|---|
| Colorado Springs | 13.4 | 48.4 | 22.5 | 117.4 | 144.1 | 82.8 |
| Vandenburg | | 35.2 | 34.5 | 130.8 | 154.4 | 70.2 |
| Hawaii | | | 69.2 | 164.5 | 150.1 | 35.8 |
| Cape Canaveral | | | | 98 | 131.3 | 104.7 |
| Ascension | | | | | 36.4 | 153.3 |

FIG. 9

SATELLITE POSITIONING SYSTEM

BACKGROUND OF THE INVENTION

1. Technical Field

This invention generally relates to satellite systems, and more specifically to a satellite orbit monitoring system which determines and maintains accurate satellite orbit data using as few as one or two ground stations. The invention also relates to providing a common satellite position and time correction data update signal applicable to all satellites in a constellation.

2. Background Art

A Global Positioning System (GPS) is a space-based radio positioning network designed to provide users who are equipped with a suitable receiver with position, velocity, and time (PVT) information. Developed by the United States Department of Defense (DOD), the space-based portion of GPS comprises a constellation of GPS satellites in non-geosynchronous 12 hour orbits around the Earth.

FIG. 1 shows an exemplary constellation 100 of GPS satellites 101 in orbit around the Earth. The GPS satellites 101 are located in six orbital planes 102 with four of the GPS satellites 101 in each plane, plus a number of "on orbit" spare satellites (not shown) for redundancy. The orbital planes 102 of the GPS satellites 101 conventionally have an inclination of 55 degrees relative to the equator and an altitude of approximately 20,200 km (10,900 miles); completing an orbit in approximately 12 hours. This configuration positions the GPS satellites 101 so that a minimum of five of the GPS satellites 101 are normally observable (above the horizon) by a GPS receiver on Earth at any given time.

A GPS PVT information calculation is based upon a concept referred to as time of arrival (TAO) ranging. The orbiting GPS satellites 101 each broadcast spread spectrum L Band signals such as, for example, L1 at 1575.42 MHz, L2 at 1227.6 MHz and L5 at 1176 MHz, encoded with the satellite ephemeris (satellite positioning data in an Earth-centered-inertial, coordinate system). A GPS receiver receives the signals from a minimum of four satellites and calculates position and time within a margin of error. The GPS receiver may be included within a handheld receiver, a monitoring station, another satellite, or other application where PVT information is useful.

Using conventional satellite positioning systems to generate satellite PVT information for each of the satellites to transmit to GPS receivers, a minimum of four geographically distant monitoring stations are required, and additional geographically distant monitoring stations, i.e. seven or more, are desirable. The four stations are required to measure one each of three position coordinates for each satellite and the time of each satellite. Because four stations are not always available to a satellite, estimations are sometimes made using the assumption that a satellite's orbit is smooth. Nevertheless, the quality and accuracy of the PVT information is related to the number of monitoring stations available. However, because the satellites are spaced from the Earth at approximately 6 times the Earth's radius, the observation geometry between a satellite and four monitoring stations at the same time is not ideal. Each of those monitoring stations monitors its pseudo range from a plurality of satellites with respect to the monitoring station's fixed and known position on Earth, and together they calculate PVT information for the satellites and transmit this information to each of the satellites individually.

With the requirement of conventional positioning systems that at least four ground monitoring stations be operable and accessible at all times to maintain an accurate GPS signal, there is a significant risk that a country's ability to rely upon its GPS system may be compromised if fewer than four monitoring stations are operable at one time. For example, the United States, which relies heavily upon GPS information with its defensive technologies, presently controls seven ground monitoring stations and would need to expend the resources to completely protect at least four of those to be able to continue defending the remainder of the country. If more than three of the seven monitoring stations were destroyed or damaged such that they could not supply the required daily data, the PVT information used by the satellites would degrade and become completely unreliable over time.

Recent technology advances in satellite positioning systems using the GPS PVT information signals have also employed crosslinking technologies, also called inter-satellite communications, which allow the satellites to communicate with each other as well as determine the relative distances between satellites. Examples of crosslinks which determine relative satellite positioning are shown and described in U.S. Pat. No. 5,979,830 to Kellermeier (Nov. 9, 1999) and U.S. Pat. No. 6,219,617 B1 to Dreischer et al. (Apr. 17, 2001), the disclosures of which are hereby incorporated herein by reference. In each of these patents, a ground monitoring station communicates PVT information to a master satellite which is central to a constellation of satellites. The master satellite, using crosslinks, determines the relative positions of each of the satellites under its control, and communicates position correction instructions to each satellite. This configuration of satellites has also been called the "anchor satellite" configuration. The master satellite, whose orbital position has been determined, acts as an anchor to coordinate the relative position corrections among the other satellites in the constellation and checks that the relative satellite positions are corrected to correspond with the appropriate positions of the satellites in the constellation. The anchor satellite configuration, however, still requires established GPS PVT information to be transmitted to the anchor satellite's receiver for the positioning configuration to properly position the satellites. Thus, the anchor satellite must still reference at least four monitoring stations to obtain accurate GPS PVT information.

DISCLOSURE OF THE INVENTION

The present invention relates to a satellite positioning system configured to maintain its positioning and clock data through the use of as few as only one or two ground monitoring stations. Through the use of crosslinks between the respective satellites in a constellation, the satellites determine their relative positions and clocks. This relative positioning and clock information is used, in conjunction with the relative positions of the two monitoring stations, to determine a positioning and clock solution which is applicable to all of the satellites in the constellation. This positioning and clock solution is then transmitted to any one of the satellites in the constellation which disseminates the solution throughout the network of crosslinks in the constellation. Each satellite applies the solution to its own position and clock data to correct its own data or position as needed.

In embodiments of the present invention, mobile monitoring stations may be used in addition to or instead of stationary stations in situations where stationary stations are impractical or undesirable. Furthermore, because the positioning effect of the methods disclosed in present invention are so stable, the single data correction satellite upload needed for the entire constellation may only be needed once every two days or once every week. This significantly reduces the processing and hardware requirements of existing satellite positioning systems. In a particular embodiment of the invention, the satellite constellation is configured as a global positioning system (GPS). The present invention also contemplates additional satellites, independent or within another constellation, temporarily and passively accessing a satellite within a constellation configured according to the present invention, determining its own relative positioning and clock and applying the constellation solution to itself to update its own clock and positioning data.

The foregoing and other features and advantages of the present invention will be apparent from the following more particular description of the particular embodiments of the invention, as illustrated in the accompanying drawings.

BRIEF DESCRIPTION OF THE DRAWINGS

FIG. 9 is a chart showing the approximate separation angles between each of the seven U.S.-controlled monitoring stations;

DETAILED DESCRIPTION OF EMBODIMENTS OF THE INVENTION

Figure 1:
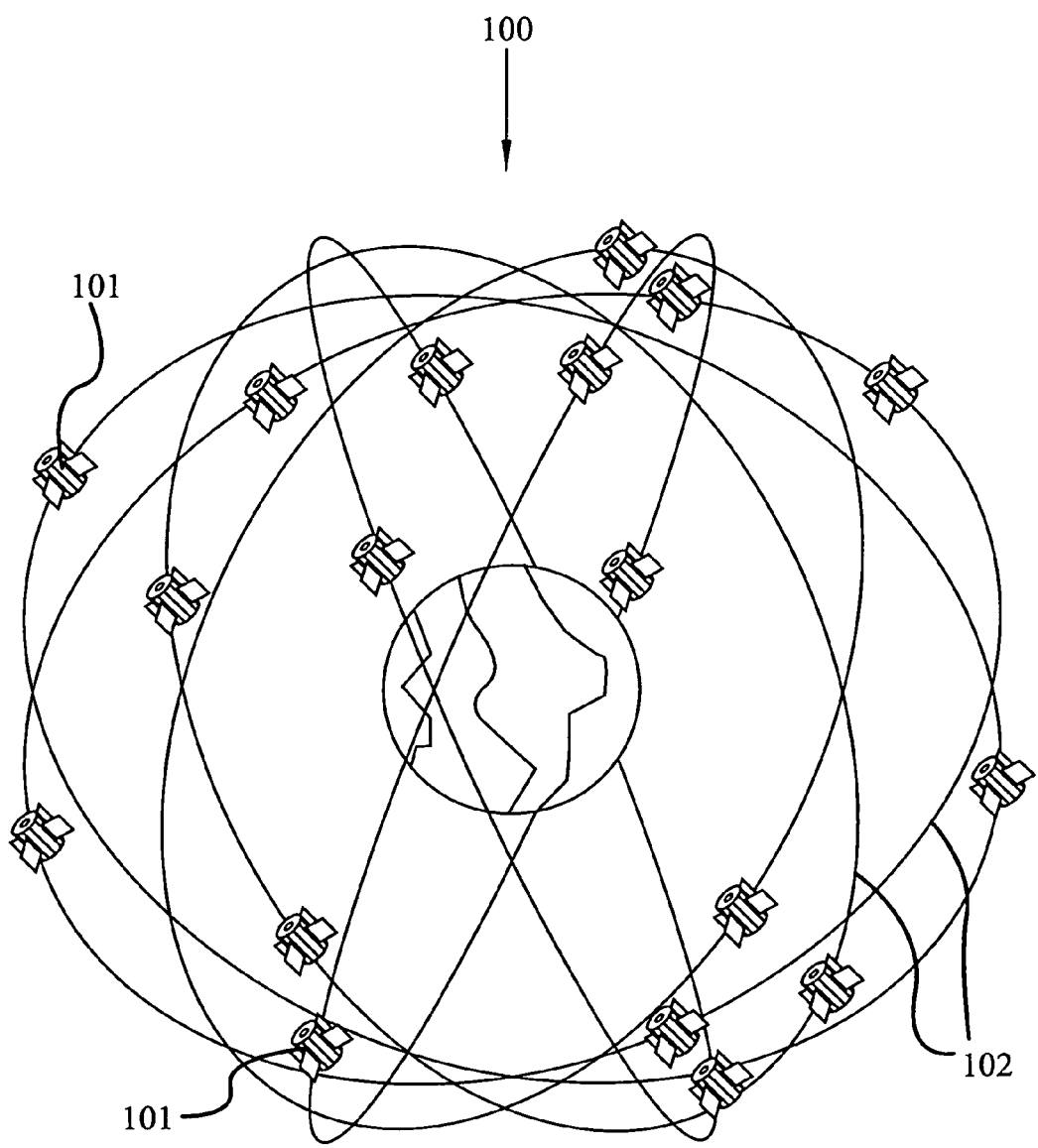
FIG. 1 is a diagram illustrating conventional GPS satellite orbits.
Figure 2:
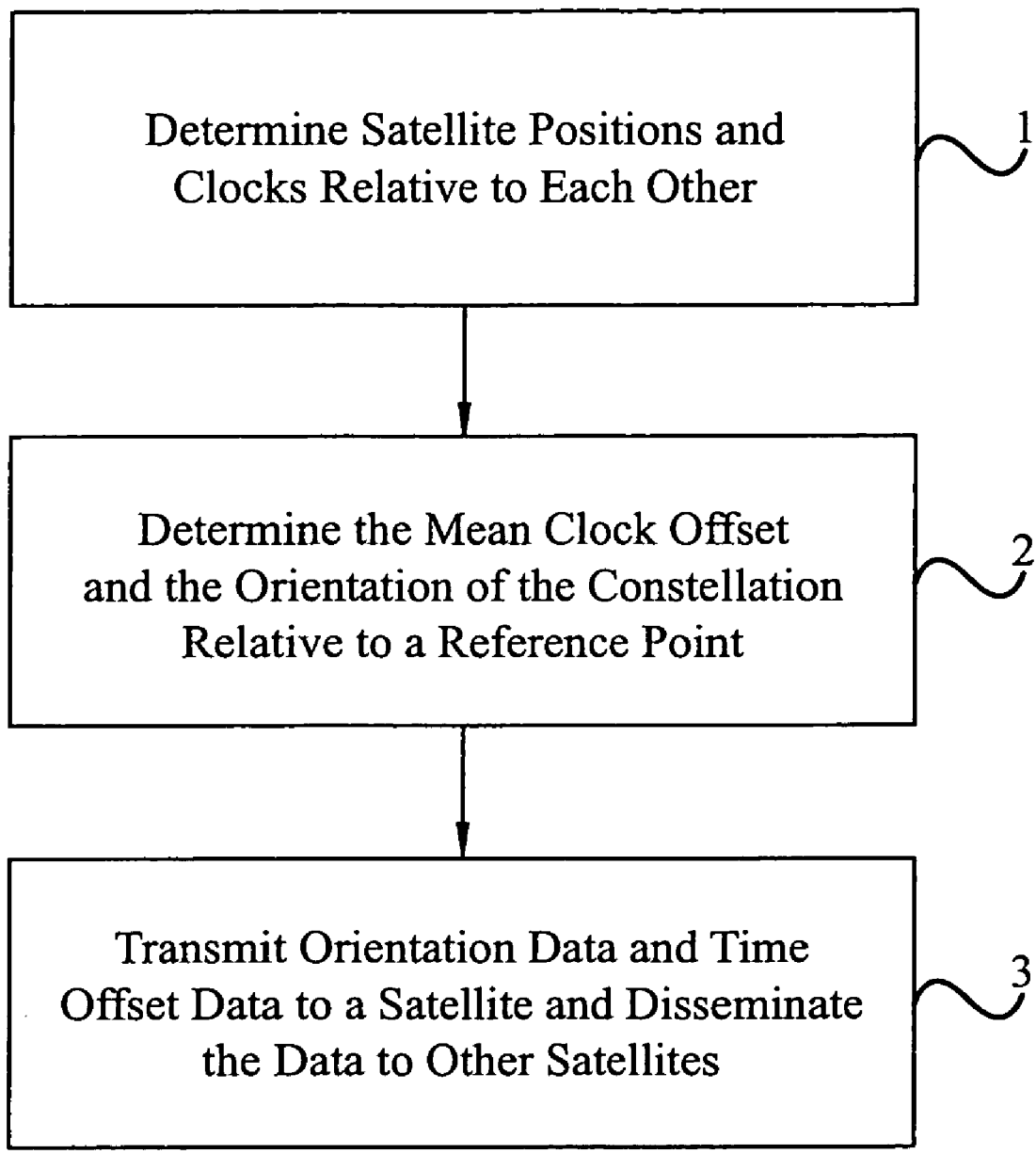
FIG. 2 is a flow diagram illustrating a method of determining an orbital position of a satellite according to an embodiment of the present invention.

FIG. 2 includes a flow diagram of a method of determining an orbital position of a satellite in a constellation and of synchronizing the clocks of the satellites in the constellation. The method includes primarily three steps which are: 1) Determine the positions and clocks of each of the satellites in the constellation relative to the other satellites in the constellation (step 1); 2) Determine the orientation of the constellation relative to the Earth, and determine the mean clock offset of the satellites in the constellation (step 2); and 3) Transmit orientation data and time offset data to a satellite in the constellation and disseminate the data to the other satellites in the constellation. As used herein, the term "orientation data" is intended to include all forms of data relating to associations between two or more calculated, measured or actual positions such as, but not limited to, distances, coordinate locations, angles, vectors, and any value or data relating to or derived from such data. Employing this method to determine the orbital locations of satellites yields improved orbital location data accuracy through reliance upon better observation geometry than previously used, requires fewer monitoring stations, reduces the required frequency of satellite uploads, and allows all satellites to be corrected with the same transmission from a ground station to any single satellite in a constellation. This may significantly reduce the amount of processing time and hardware necessary to maintain an orbital or global positioning system.

Figure 3:
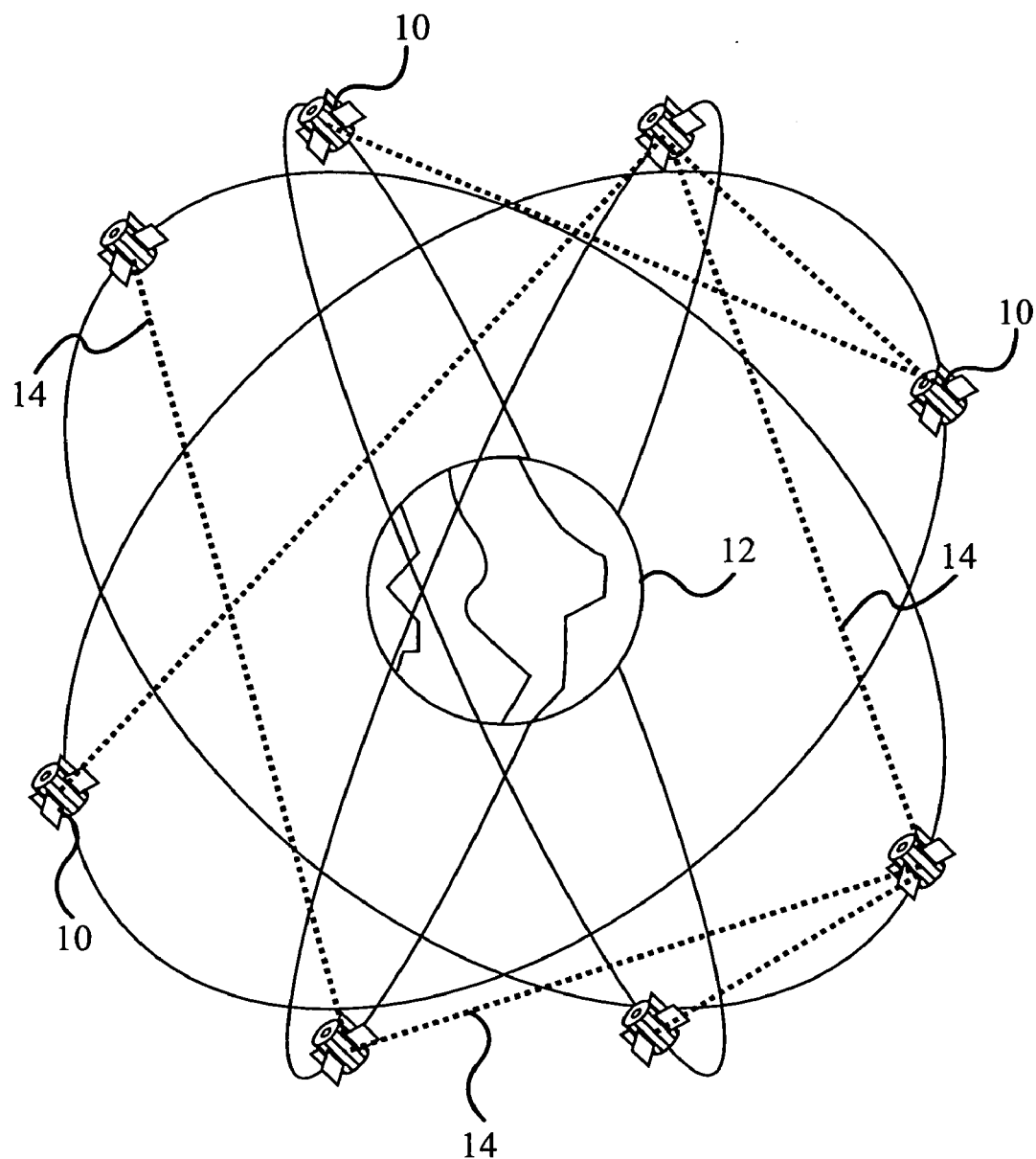
FIG. 3 is a pictorial diagram of a GPS satellite constellation using crosslinking to determine relative positions according to a first step of an embodiment of the present invention.

Step 1 of the method of FIG. 2 involves using crosslink measurements between satellites to accurately determine the position and clock of each satellite relative to the other satellites in a constellation. Conventional satellite configurations comprise crosslink capabilities which allow satellites to communicate with each other, and which have been used to determine a distance to and relational position of an adjacent satellite. Two more examples of crosslink technology are shown and described in U.S. Pat. Nos. 5,971,324 to Williams et al. (Oct. 26, 1999), and 6,125,261 to Anselmo et al. (Sep. 26, 2000), the disclosures of which are hereby incorporated herein by reference. As shown in FIG. 3, the satellites 10, which are orbiting the Earth 12, are communicating by crosslink as represented by communication lines 14 to establish pseudo range measurements for a fixed point in time. By using crosslinking between the satellites which are all out in space to determine the relative distance measuring rather than comparing the satellites' pseudo ranges to four or more ground monitoring stations, observation geometry is improved.

Figure 4:
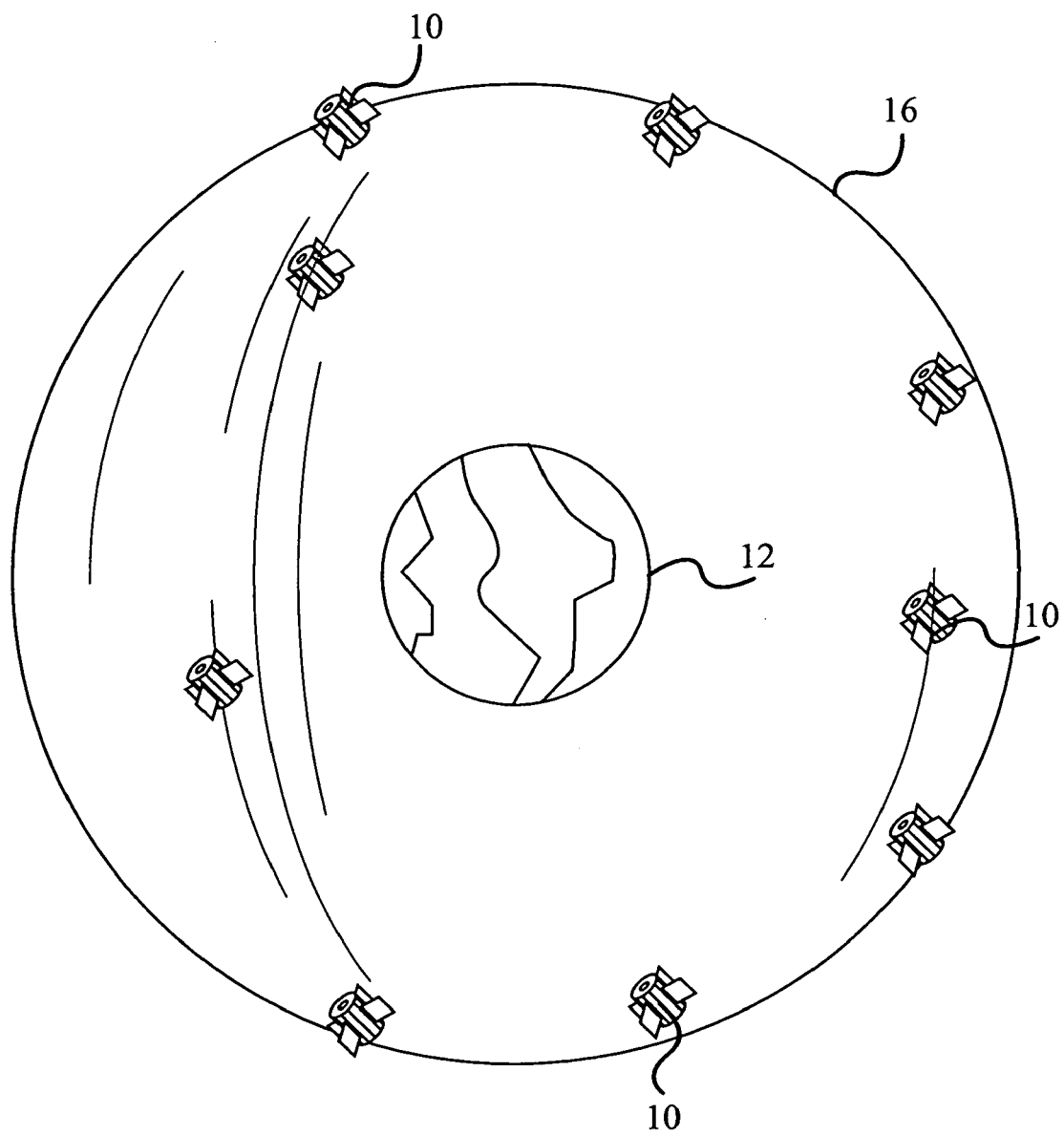
FIG. 4 is a pictorial diagram of a GPS satellite constellation illustrating the satellite constellation as a rigid body for the purposes of a second step of an embodiment of the present invention.

As illustrated by FIG. 4, once the pseudo range measurements are determined for a fixed point in time, the satellite 10 constellation orbiting the Earth 12 may be treated, for calculation purposes, as a rigid shell 16 surrounding the Earth 12. If the satellites 10 do not completely surround the Earth, they may, nevertheless, be treated, for calculation purposes, as a rigid shape for that point in time to which the relative positioning and clock determinations apply. In other words, the positioning system according to this embodiment of the present invention fixes the solution with respect to a time reference and treats the constellation as a whole instead of just fixing individual satellites as has been proposed in the past. It should be noted that at this point, the pseudo range measurements for the satellites in the constellation are determined irrespective of any Earth-based reference or coordinate system. By determining the pseudo range measurements for the satellites relative only to the other satellites in the constellation, the constellation may be treated as a rigid body and may be mapped and adjusted separate from the Earth's variations. This pseudo range data is transmitted to one or more monitoring stations for use in step 2 of the method of FIG. 2.

Step 2 of the method of FIG. 2 involves using pseudo range measurements from as few as one or two satellite signal monitoring stations to determine the orientation of the constellation relative to the Earth, and to determine a mean clock offset for the satellites of the constellation. The system does this by downloading the relative position and clock data from the satellites and by evaluating the distances from the various satellites to the monitoring station.

Monitoring stations make ground observations of satellite signals (for example L1/L2 pseudo-range measurements from GPS satellites transmitted to a monitoring station) and are combine data included in these observations in a Kalman or similar type filter to determine constellation orientation and time offset with respect to a common reference, such as the monitoring station's position on Earth. In one particular embodiment of the invention wherein the constellation orientation is determined using only two monitoring stations, three constellation orientation angles, $\theta_x$, $\theta_y$ and $\theta_z$, are determined with respect to an Earth-centered inertial ("ECI") frame. An ECI frame is chosen for exemplary purposes only and the use of other reference frames is possible. The observation vector for the filter relates the orientation angles and a time error vector to a range residual error (measured pseudo-range minus computed pseudo-range) using relational measurement data. For this particular embodiment of the invention, exemplary equations are defined below:

$$H[\Theta_x] = -\left(\frac{(Psat_y - Pgnd_y)}{|Psat - Pgnd|}\right) * Psat_z + \left(\frac{(Psat_z - Pgnd_z)}{|Psat - Pgnd|}\right) * Psat_y$$

$$H[\Theta_y] = -\left(\frac{(Psat_z - Pgnd_z)}{|Psat - Pgnd|}\right) * Psat_x + \left(\frac{(Psat_x - Pgnd_x)}{|Psat - Pgnd|}\right) * Psat_z$$

$$H[\Theta_z] = -\left(\frac{(Psat_x - Pgnd_x)}{|Psat - Pgnd|}\right) * Psat_y + \left(\frac{(Psat_y - Pgnd_y)}{|Psat - Pgnd|}\right) * Psat_x$$

$$H[\delta_t] = -1$$

Where Psat=Position of Satellite in an ECI frame {$Psat_x$, $Psat_y$, $Psat_z$}; and Pgrd= Position of Ground Station in an ECI frame {$Pgrd_x$, $Pgrd_y$, $Pgrd_z$}. This observation vector {$\theta_x$, $\theta_y$, $\theta_x$, and $\delta t$} relates to an observation between a monitoring station and a single satellite. Observations from multiple satellites may than be arranged into a matrix $H_m$ and the range residual error into a vector $r_{residual}$.

The solution for the constellation orientation and timing error may be calculated in a least squares form from the equation:

$$x_{solution} = ((H_m^T * H_m) * H_m^T) * r_{residual}$$

Where, by convention, T indicates the matrix is to be transposed, and −1 indicates the matrix is to be inverted. This solution vector $x_{solution}$ is applicable to all satellites in the constellation and may be used by each of the satellites as described with reference to step 3 of the method of FIG. 2.

In another particular embodiment of the invention wherein the constellation orientation is determined using only one monitoring station, the same types of angles and vector data are used to determine the constellation orientation, but the measurements are taken from a single monitoring station over time. By forming the vector matrices from data collected by a single monitoring station over time, in essence, the single monitoring station looks like two or more monitoring stations. This enables the necessary relative positional data to be gathered and the constellation orientation calculated even if only one monitoring station is available or able to receive valid data.

Step 3 of the method of FIG. 2 involves uploading the constellation time offset and three orientation angles to any satellite in the constellation. The satellites may be configured to disseminate this "orientation data" to the other satellites of the constellation through crosslink for individual correction based upon their respective orbits.

One example of equations which may be used to apply these corrections to an individual satellite are of the form:

$$\text{temp}(\omega) = \omega + \frac{(\Theta_x * \sin(\Omega_0) - \Theta_y * \cos(\Omega_0))}{\sin(I_0)}$$

$$\text{temp}(\Omega_0) = \Omega_0 + \Theta_z + \frac{(-\Theta_x * \sin(\Omega_0) * \cos(I_0) + \Theta_y * \cos(\Omega_0) * \cos(I_0))}{\sin(I_0)}$$

$$\text{temp}(I_0) = I_0 + \Theta_y * \sin(\Omega_0) + \Theta_x * \cos(\Omega_0)$$

$$\text{corrected}(\omega) = \omega + \frac{(\Theta_x * \sin(\text{temp}(\Omega_0)) - \Theta_y * \cos(\text{temp}(\Omega_0)))}{\sin(\text{temp}(I_0))}$$

$$\text{corrected}(\Omega_0) = \Omega_0 + \Theta_z + \frac{\begin{array}{c}(-\Theta_x * \sin(\text{temp}(\Omega_0)) * \cos(\text{temp}(I_0)) + \\ \Theta_y * \cos(\text{temp}(\Omega_0)) * \cos(\text{temp}(I_0)))\end{array}}{\sin(\text{temp}(I_0))}$$

$$\text{corrected}(I_0) = I_0 + \Theta_y * \sin(\text{temp}(\Omega_0)) + \Theta_x * \cos(\text{temp}(\Omega_0))$$

Where $\omega$=an argument of perigee, $\Omega_0$=the longitude of the ascending node, and $I_0$=the inclination angle.

Figure 5:
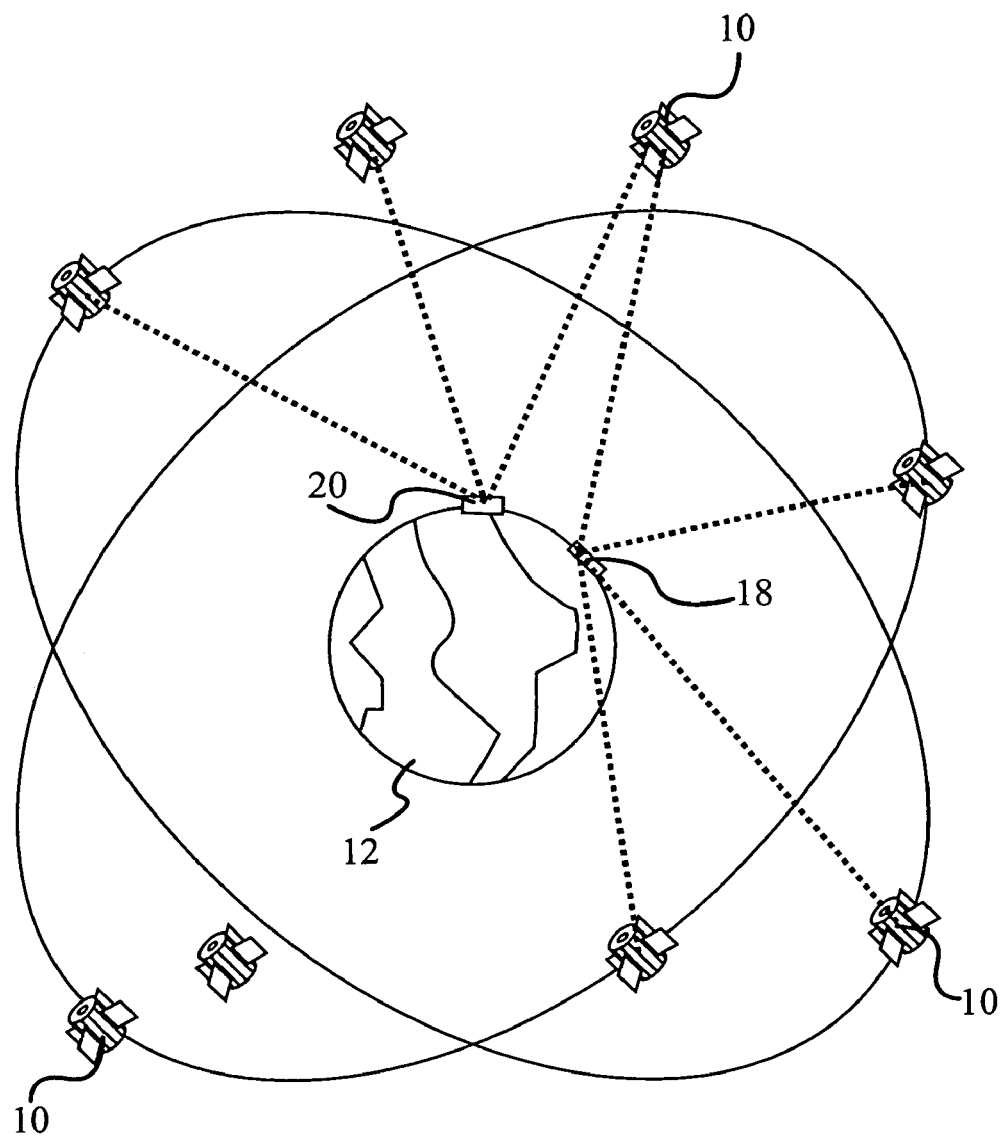
FIG. 5 is a pictorial diagram of a GPS satellite constellation transmitting relative position and clock signals to monitoring stations according to an embodiment of the present invention.

As shown in FIG. 5, as few as one or two monitoring stations 18 and 20 on the Earth 12 receive pseudo range measurements from the satellites above their horizon to determine the constellation's mean clock offset and its orientation relative to the Earth 12. Using the pseudo range measurements from one monitoring station at a fixed time, two dimensions of a coordinate system may be determined. The third dimension, which relates to the axis extending from the center of the Earth through the monitoring station, cannot be accurately determined from only a single monitoring station at the same fixed time because the satellites transmitting relative positional data to the monitoring station are not calibrated to an Earth-centered inertial frame of reference and, therefore, may be rotated about this axis with no difference in their relative distance measurements to the monitoring station. To determine the third dimension of the measurements and accurately identify the orientation of the rigid constellation for a specific point in time, a second satellite signal monitoring station may be used. Alternatively, the third dimension measurements may be determined by the first monitoring station at a different fixed point in time. By using a second reference point receiving its own pseudo range measurements, or the first reference point at a different fixed time, the third dimension may be accurately determined.

To obtain the measurement components to make the needed calculations for constellation orientation and mean time offset, four measurements are needed (five if clock synchronization of the two monitor station clocks is desired). These four measurements may be selected from among the numerous measurements taken by an available monitoring station. At any given time in a 24 satellite constellation, such as the present GPS constellation, approximate 20 measurements will be available between the two stations, but we only need 4. If we assume that the error experienced in the actual signals is primarily noise, the error will decrease by the square root of the number of measurements available just for a single sampling. Due to the stability of the measured quantities, however, the error will continue to decrease due to the numerous stable measurements taken over time.

Figure 6:
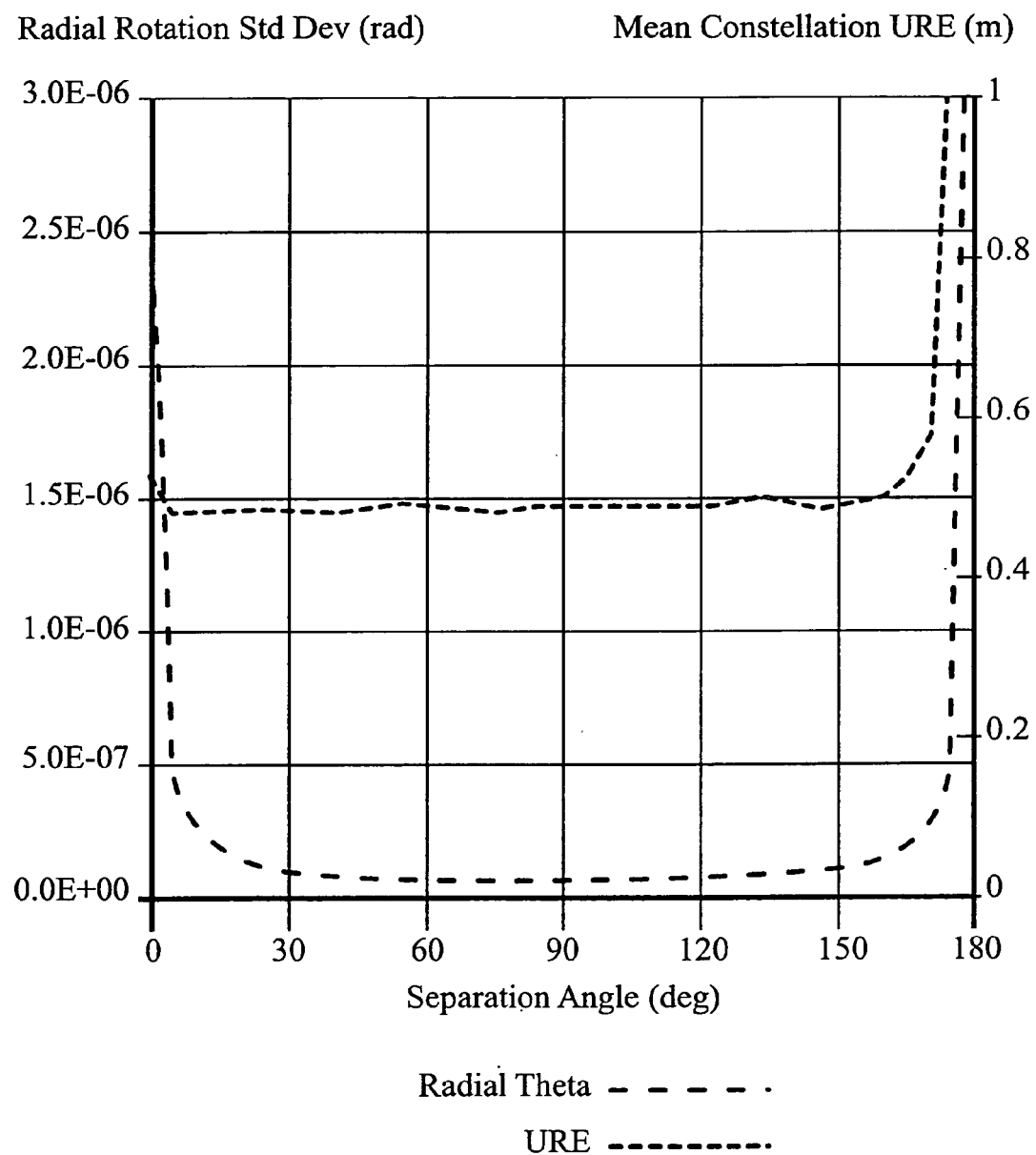
FIGS. 6–8 are X-Y plots illustrating the effects of monitoring station placement on satellite positioning accuracy for three separate scenarios for instantaneous estimation with two monitoring stations.
Figure 7:
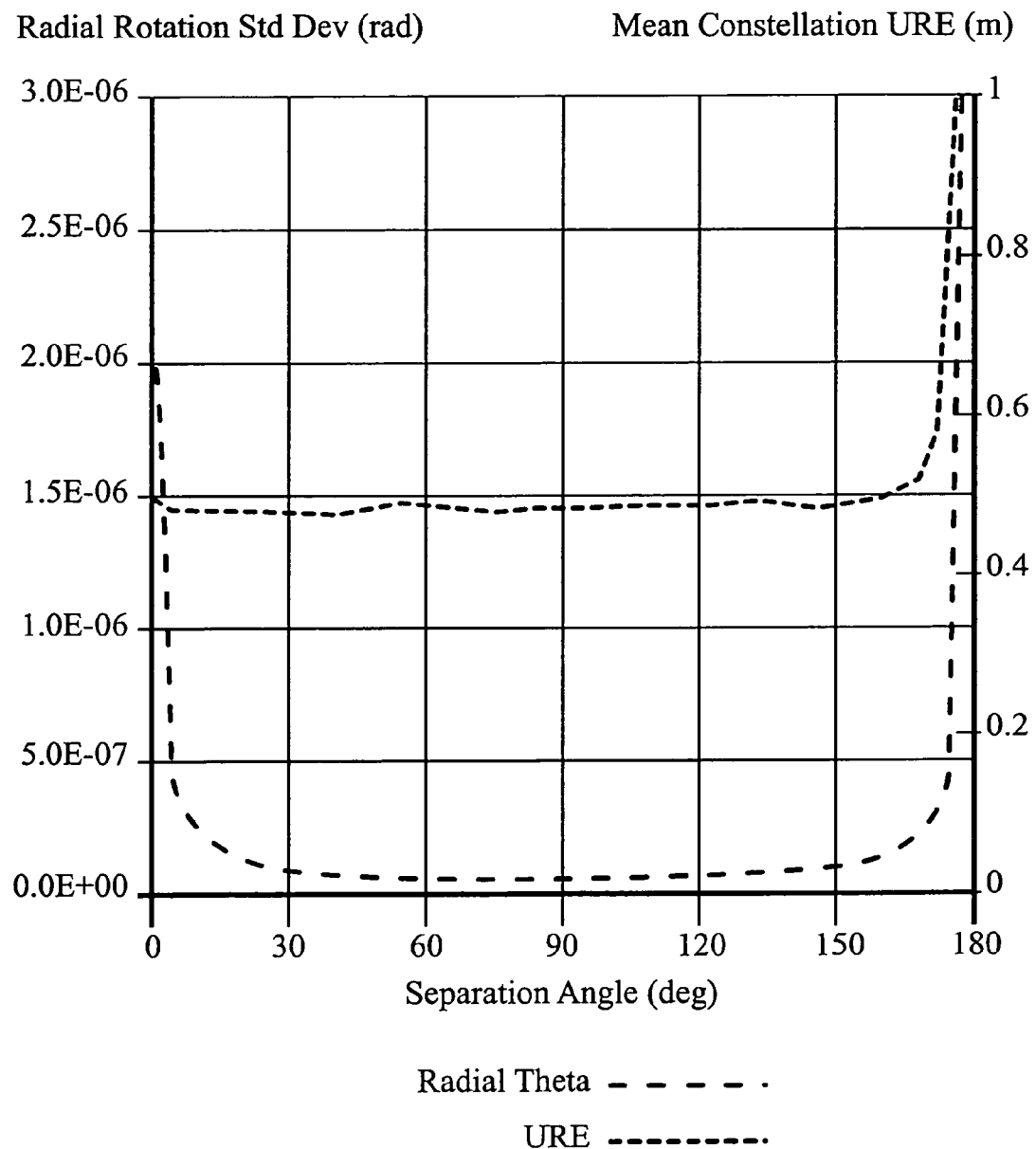
Figure 8:
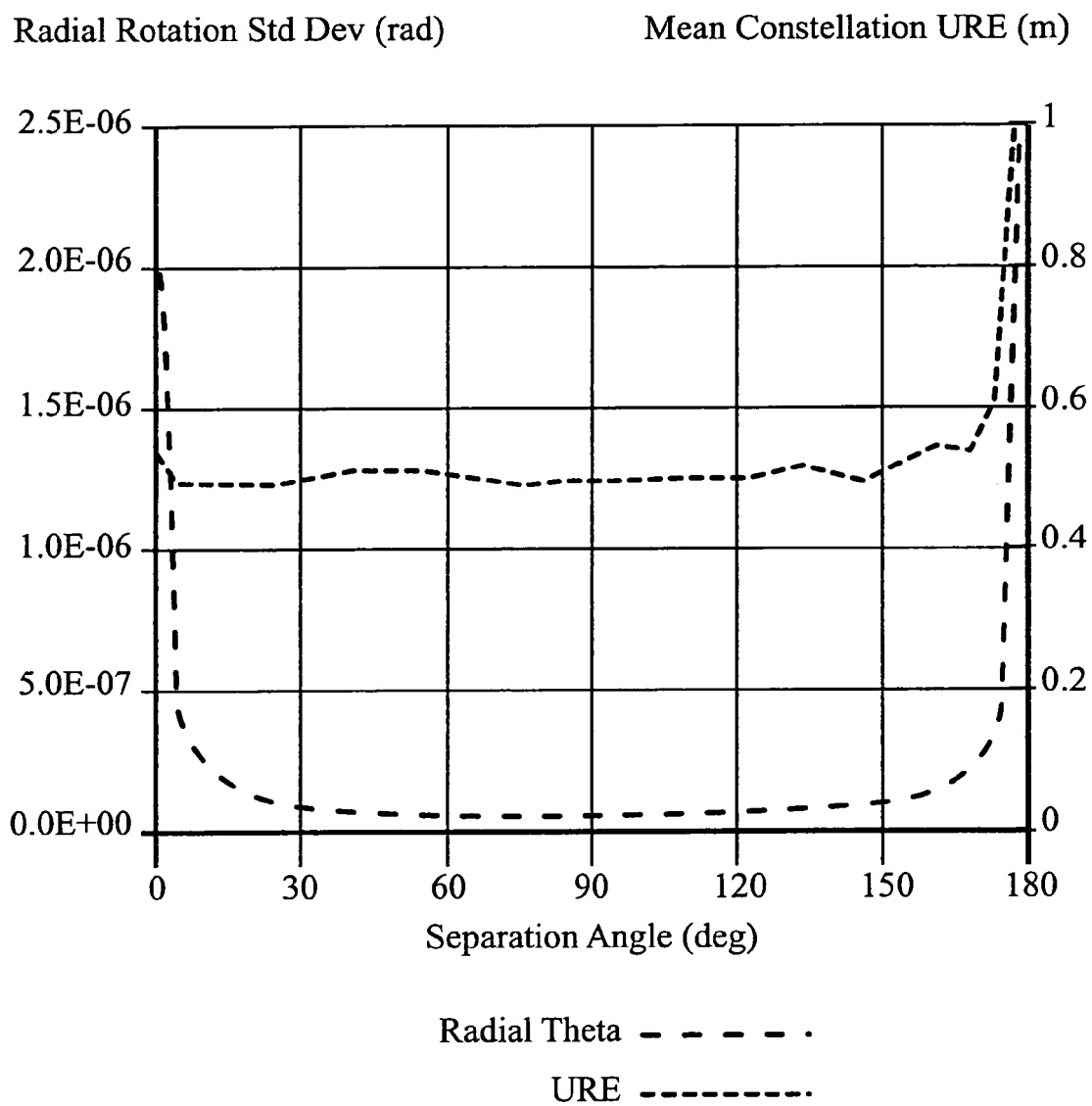

While two stations are needed for a single time point determination, various spacings of the two satellite signal monitoring stations result in varying degrees of accuracy. This is because two monitoring stations placed very near each other receive similar measurements from the satellites and make it difficult to determine the third dimension of the constellation orientation because the location of the monitor station has not changed sufficiently in the ECI frame due to earth rotation. Similarly, separate measurements taken from a single monitoring station very close together in time make it difficult to accurately determine the third dimension of the constellation orientation because the respective satellites have not had sufficient time to change relative position in the sky. FIGS. 6, 7 and 8 include graphs of the approximate separation angle between two monitoring stations versus both the mean constellation user range error ("URE") and the radial rotation standard deviation. The mean constellation URE is a measure of satellite ephemeris and time accuracy as seen by a user. The radial rotation standard deviation is a measure of the noise or variation of the constellation orientation estimation process along a radius of the constellation. The graphs shown in FIGS. 6–8 were generated using specialized satellite simulation software developed by Systems Engineering Associates, Inc. of Vermont. FIG. 6 includes the results of a simulation based upon a first monitoring station placed on the equator and a second monitoring station separated latitudinally from the first monitoring station. FIG. 7 includes the results of a simulation based upon a first monitoring station placed on the equator and a second monitoring station separated longitudinally from the first monitoring station. FIG. 8 includes the results of a simulation based upon a first monitoring station placed on a pole of the Earth and a second monitoring station separated latitudinally from the first monitoring station. Each of the simulations described herein involves data representing the actual locations and paths of the GPS satellites orbiting the Earth.

Without access to simulated or actual data, one would assume that a 90 degree separation between stations would provide the most accurate data because this allows for observation of the rigid constellation from two distinct axes of a reference coordinate system. As can be seen by the graphs of FIGS. 6–8, however, the monitoring stations do not need to be placed so precisely to obtain accurate results. Generally, with reference to FIGS. 6–8, a separation of greater than about 10 degrees and less than about 170 degrees provides an acceptable constellation orientation determination, separation of between about 20–160 degrees provides an accurate constellation orientation determination, and a separation of between about 30–150 degrees provides an equivalent constellation orientation determination. The curve is nearly flat between about 30 degrees and about 150 degrees separation.

Figure 10:
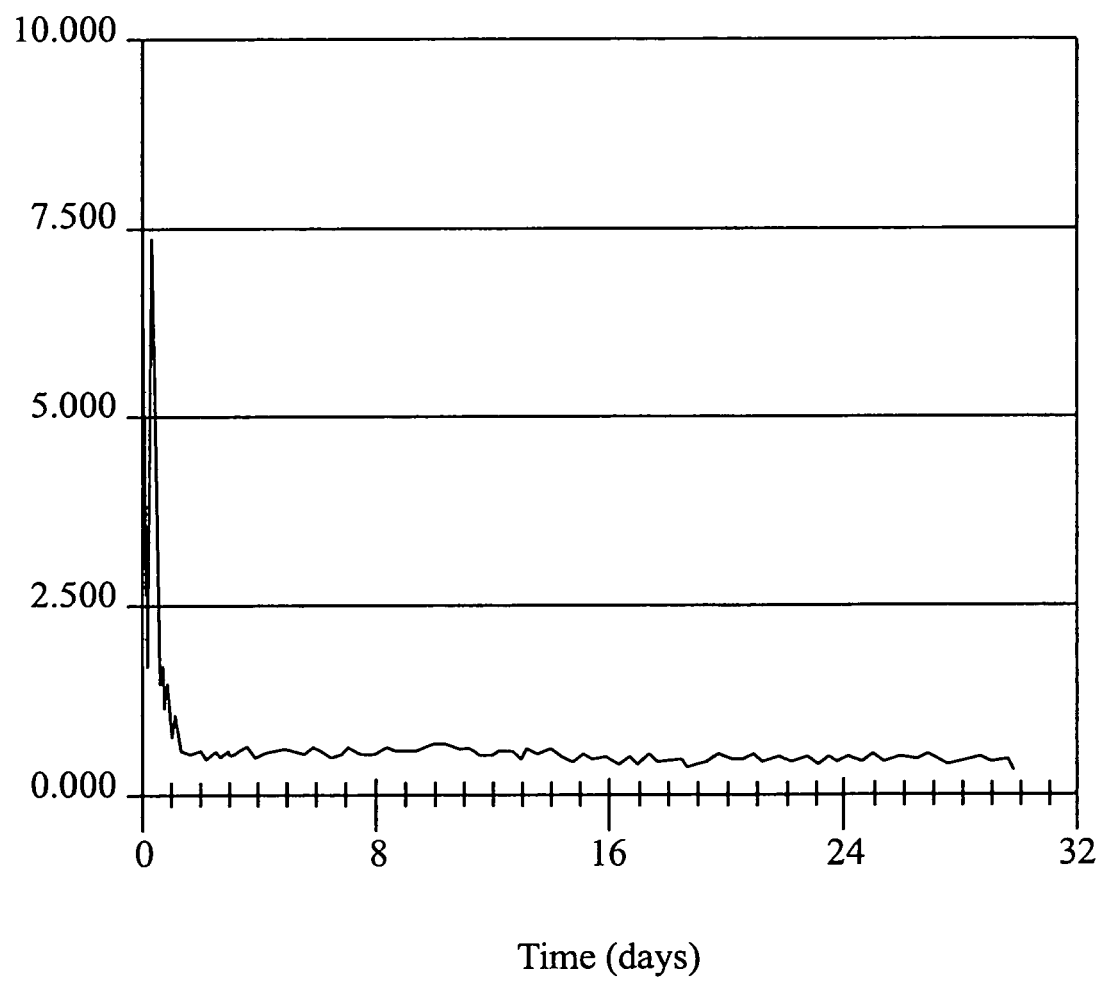
FIGS. 10–12 is an X-Y plot illustrating the constellation URE for three separate examples where different configurations of U.S.-controlled monitoring stations are used.
Figure 11:
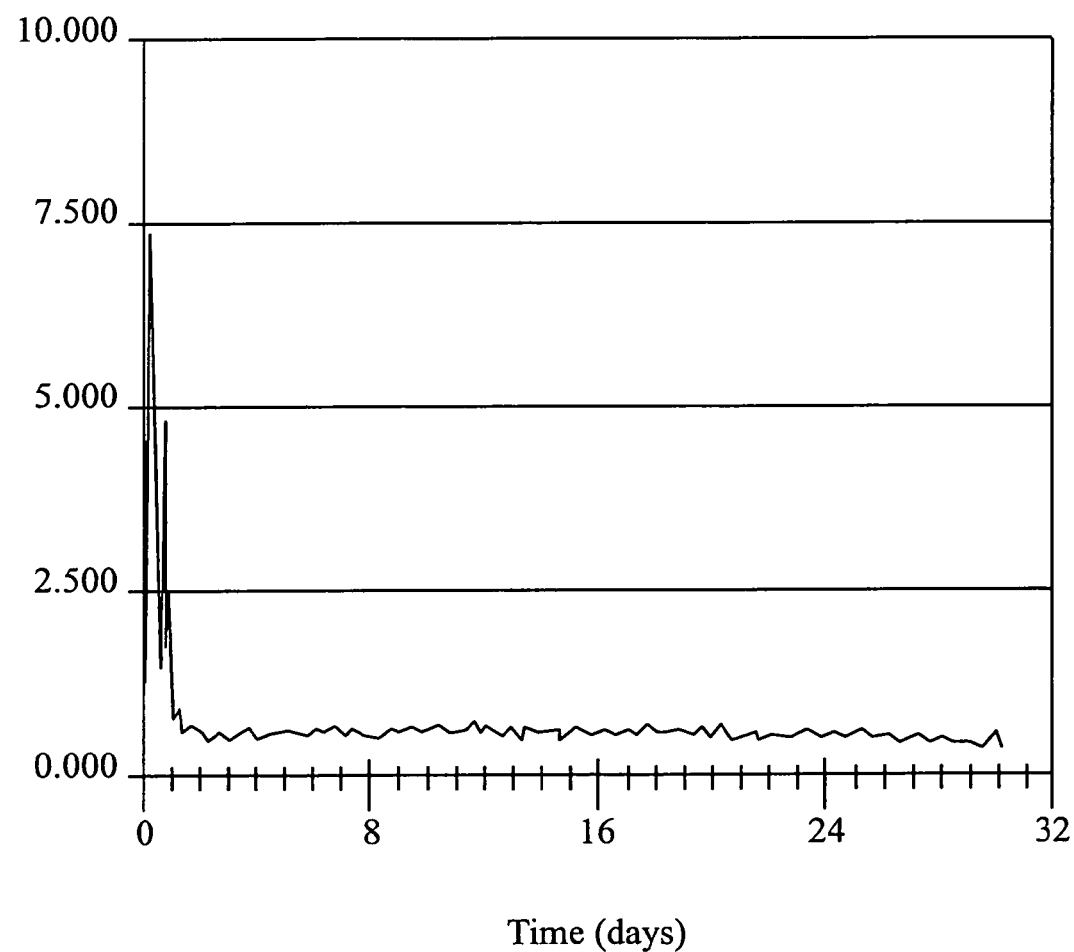
Figure 12:
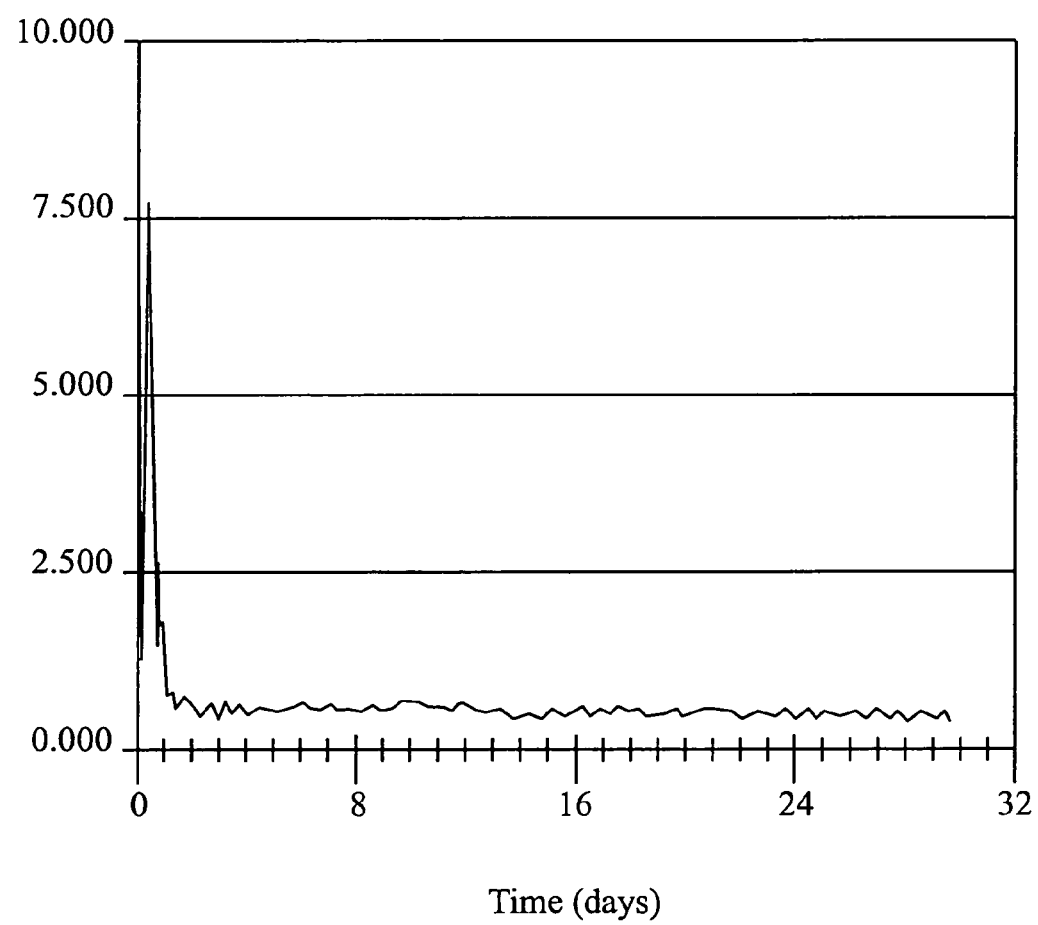

FIG. 9 includes a chart showing the separation angles in degrees between the respective seven monitoring stations controlled by the United States. The two closest U.S.-controlled monitoring stations are Colorado Springs and Vandenberg which are approximately 13.4 degrees apart. The two farthest U.S.-controlled monitoring stations are Hawaii and Ascension which are approximately 164.5 degrees apart. As shown in FIG. 10, when all seven U.S. monitoring stations are used to determine the orientation of the GPS satellite constellation, the mean 8-day URE is 0.48 m (standard deviation is 3.3 cm). However, as shown in FIGS. 11 and 12, even using only the two closest U.S. controlled monitoring stations (FIG. 11) or the two farthest U.S.-controlled monitoring stations (FIG. 12), the results are almost identical to using all seven U.S.-controlled monitoring stations. The mean 8-day URE for a simulation using only the Colorado Springs and Vandenberg monitoring stations (13.4 degrees apart) is 0.47 m (standard deviation is 3.3 cm). The mean 8-day URE for a simulation using only the Hawaii and Ascension monitoring stations (164.5 degrees apart) is 0.48 m (standard deviation is 3.4 cm). This means that while using more than two of the existing U.S.-controlled satellite signal monitoring stations to determine satellite constellation orientation adds redundancy to the system, it may not significantly improve the accuracy of the results. More importantly, this also means that the United States could lose any five of its seven monitoring stations and still function with the same accuracy in its GPS system.

Figure 13:
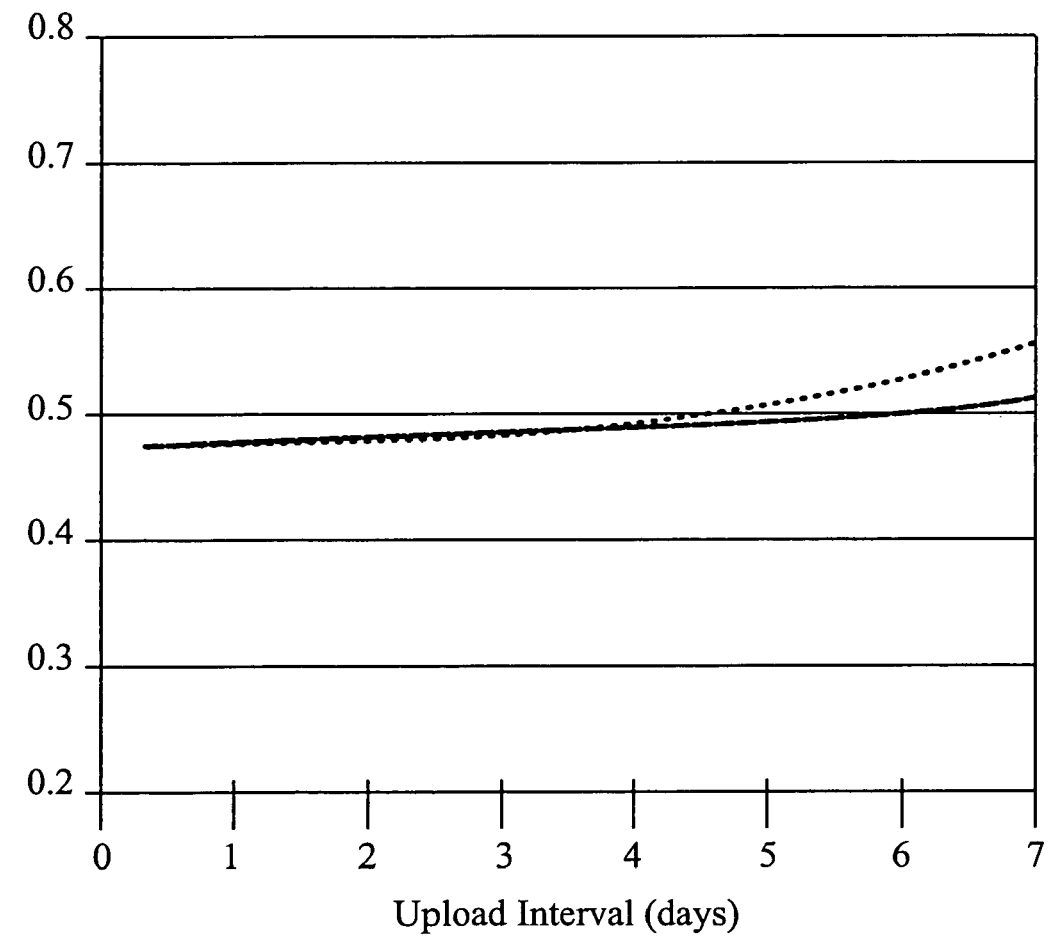
FIG. 13 is an X-Y plot illustrating the change in constellation URE over time since the last correction data upload.

Conventionally, to maintain its degree of accuracy, the control segment must upload ephemeris data to each individual satellite at least once per day. FIG. 13 illustrates the results of a simulation of an embodiment of the present invention showing the constellation URE as a function of time between uploads. As indicated in FIG. 13, the constellation URE for a satellite positioning system configured according to an embodiment of the present invention remains constant through the second day since an upload, and relatively constant until about the fourth day since the upload. Even at seven days since the upload, the constellation URE is less than 0.1 m higher than its baseline error. The 8-day mean URE is a measure of the mean URE throughout each day, while the Mean URE at the End of the Interval is a measure of the URE just before an upload which indicates the worst case time error. Thus, in addition to using fewer monitoring stations, systems configured according to an embodiment of the present invention using two monitoring stations only need uploads about once every 2–4 days, and could last even longer than a week if needed, without significant accuracy degradation.

The advantages of the present invention are further expanded through the ability to use a mobile satellite signal monitoring station in addition to, or instead of, a fixed one. Because embodiments of the present invention do not require multiple measurements from to and from every satellite every day, one or more temporary sites may be used to merely collect positioning and time offset data for the constellation. The appropriate calculations may then be made and transmitted to one or more satellites of the constellation from any place at any time. For example, if no fixed monitoring stations were available, such as during a war where the monitoring stations have been destroyed, one or more disguised mobile monitoring stations may be temporarily placed at a predetermined location just long enough to take the necessary measurements, and then move on. The collected measurements from the one or more stations may then be combined with other measurements to determine the appropriate orientation and mean clock offset for the constellation. Because the orientation solution is referenced to a fixed point in time and is equally applicable to all satellites in the constellation, it may be transmitted to any satellite in the constellation at any point in the near future (such as a week). The satellite which receives the solution may be configured to automatically disseminate the solution throughout the constellation network without regard to whether a particular satellite can see the transmitter location. Additionally, because the results are so stable, another measurement and upload to a single satellite may not be necessary for a week or more. At that time, the mobile monitoring stations may be sent to the same or different predetermined locations to again take measurements. In relation to the separation of the locations for taking measurements if two monitoring stations are used, or if a single monitoring station takes measurements at different locations, 300 land miles is approximately 5 degrees which may even be enough of a separation for an accurate determination. In any case, however, as may be seen from the simulated examples shown herein, even approximately 13 degrees separation (780 miles) is enough for accurate orientation results. Therefore, any number of mobile monitoring stations may be sent out to gather data and no fixed monitoring station is required.

Figure 14:
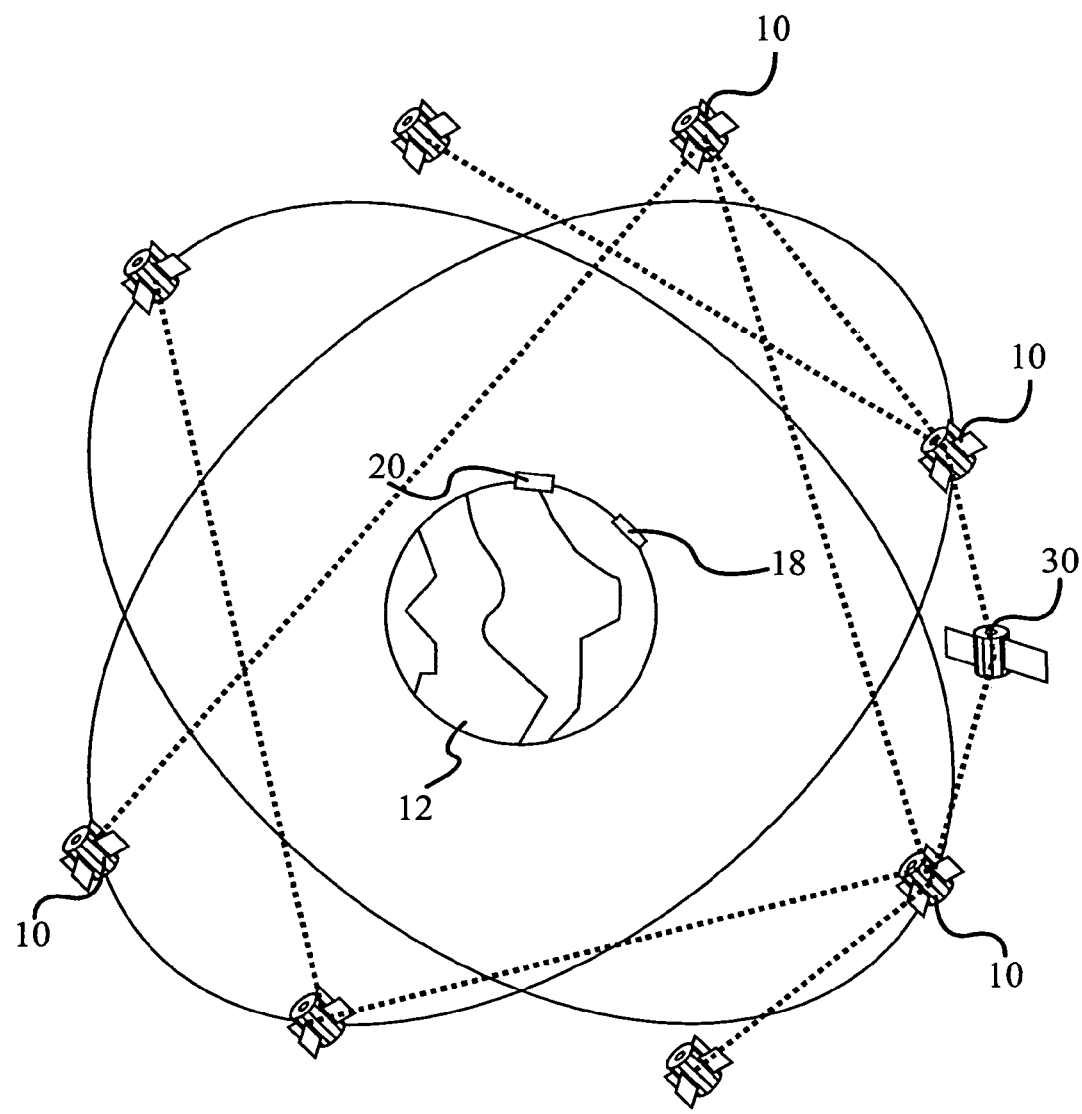
FIG. 14 is a pictorial diagram of a separate satellite using crosslinking to access a satellite constellation configured according to an embodiment of the present invention to determine its position with respect to the constellation and update its position and clock data accordingly.

It is also contemplated, as illustrated in FIG. 14, that one or more additional satellites 30 may take passive or interactive readings from satellites 10 in a constellation, including relational positioning, time offset and a solution which was calculated for the constellation, to realign the satellite's orbital positioning and clock data. This enables a passing satellite 30 to join a constellation solely for the purpose of correcting its position and clock reference data. By accessing such data in space rather than directly through four or more monitoring stations 18 and 20 on the Earth, there is less chance for interference and poor observation geometry, and better and more direct results. The passing satellite 30 may only need to access a constellation, such as the GPS constellation, and may not need to rely upon ground stations for its positional and clock data.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, it will be clear to those of ordinary skill in the art that while the specific examples provided herein relate to GPS satellite systems, the various aspects of the present invention are applicable to all satellite systems and may be readily applied to those systems from the teachings provided herein.

What is claimed is:

1. A positioning system configured to determine an orbital location of a non-geosynchronous satellite in a satellite constellation, the system comprising:
   at least one satellite signal monitoring station each configured to determine constellation orientation data from a signal received from at least a first non-geosynchronous satellite of the constellation;
   a processor configured to receive data from the at least one satellite signal monitoring station in response to the constellation orientation data and to calculate constellation orientation corrections; and
   a transmitter configured to transmit the constellation orientation corrections to at least one non-geosynchronous satellite of the constellation.

2. The positioning system of claim 1, wherein the processor is configured to calculate a constellation orientation solution applicable to all satellites in the constellation.

3. The positioning system of claim 1, wherein each satellite in the constellation is configured to determine its position relative to at least one other satellite in the constellation and transmit its relative position to a satellite signal monitoring station.

4. The positioning system of claim 1, wherein each satellite signal monitoring station is configured to receive relative position data from a plurality of satellites in the constellation.

5. The positioning system of claim 1, wherein the at least a first satellite and the at least one satellite of the constellation are the same satellite.

6. The positioning system of claim 1, wherein the at least one satellite signal monitoring station comprises only two satellite signal monitoring stations.

7. The positioning system of claim 1, wherein at least one of the satellite signal monitoring stations is a mobile satellite signal monitoring station.

8. The positioning system of claim 1, wherein the system is further configured to monitor relative time offsets for the constellation satellites and transmit a time offset solution applicable to all satellites in the constellation.

9. The positioning system of claim 1, wherein the positioning system is a GPS system, the satellite is a GPS satellite, the satellite constellation is a constellation of GPS satellites and the at least one satellite signal monitoring station is a GPS signal monitoring station.

10. A method of determining an orbital location of a non-geosynchronous satellite in a constellation, the method comprising:
    determining a location of a first non-geosynchronous satellite in the constellation relative to a second non-geosynchronous satellite in the constellation;
    determining an orientation of the constellation relative to a reference after determining the relative locations of the first and second non-geosynchronous satellites to each other; and
    transmitting constellation orientation data to at least one non-geosynchronous satellite in the constellation.

11. The method of claim 10, further comprising determining location corrections for each of the first and second satellite in response to the orientation data.

12. The method of claim 10, further comprising disseminating the orientation data to each of the satellites in the constellation.

13. The method of claim 12, further comprising disseminating the orientation data through crosslinks associated with each of the satellites in the constellation.

14. The method of claim 10, wherein determining the orientation of the constellation relative to a reference comprises determining a position vector for the first satellite in the constellation and determining a position vector for a satellite signal monitoring station receiving signals from the first satellite.

15. The method of claim 14, wherein determining the orientation of the constellation relative to a reference further comprises determining an orientation angle vector for the constellation from the position vectors of the first satellite and the satellite signal monitoring station.

16. The method of claim 15, wherein determining the orientation of the constellation relative to a reference further comprises determining an orientation angle vector for the constellation from a position vector of the second satellite and the position vector of the satellite signal monitoring station.

17. The method of claim 16, wherein determining the orientation of the constellation relative to a reference further comprises forming a matrix of orientation angle vectors for the constellation including orientation angle vectors determined with reference to each of the first satellite and the second satellite.

18. The method of claim 10, wherein determining the location of the first satellite in the constellation relative to the second satellite in the constellation is determined without regard to any Earth-based reference.

19. The method of claim 10, wherein determining the orientation of the constellation relative to a reference comprises determining the orientation using only two satellite signal monitoring stations.

20. The method of claim 10, wherein determining the orientation of the constellation relative to a reference comprises determining the orientation using only one satellite signal monitoring station.

21. The method of claim 10, wherein determining the orientation of the constellation relative to a reference comprises determining the orientation using at least one mobile satellite signal monitoring station.

22. The method of claim 10, wherein the satellite in a satellite constellation is a GPS satellite in a GPS constellation.

23. The method of claim 10, further comprising determining a satellite clocks relative to each other, determining a mean clock offset, and transmitting time offset data with the orientation data.

24. A method of determining an orbital location of a satellite, the method comprising:
  determining position and clock data of the satellite in relation to position and clock data of other satellites in a constellation of satellites;
  determining a mean clock offset for the constellation and an orientation of the constellation relative to Earth; and
  transmitting constellation orientation data and time offset data to a satellite in the constellation of satellites.

25. The method of claim 24, wherein the constellation orientation data and time offset data comprise a constellation solution applicable to all satellites in the constellation.

26. The method of claim 25, further comprising transmitting the constellation solution to all satellites in the constellation.

27. The method of claim 26, wherein transmitting the constellation solution to all satellites comprises transmitting the constellation solution from a satellite to another satellite through a crosslink.

28. The method of claim 25, further comprising adjusting at least one of a satellite's position and clock data in response to the constellation solution.

29. The method of claim 24, wherein the satellite is a GPS satellite and the constellation of satellites is a constellation of GPS satellites.

30. The method of claim 24, further comprising determining each satellite's position and clock data relative to other satellite position and clock data in the constellation and transmitting relative position and clock data from at least one of the satellites to at least one satellite signal monitoring station.

31. The method of claim 30, further comprising receiving the relative position and clock data from a plurality of satellites in the constellation at the satellite monitoring station.

32. The method of claim 24, further comprising monitoring the relative position and clock of a satellite at a mobile satellite signal monitoring station.

33. The method of claim 24, wherein determining the orientation of the constellation of satellites comprises determining at least one of a constellation orientation angle and an observation vector.

34. The method of claim 24, wherein determining the position of the satellite in relation to the constellation of satellites comprises determining a position vector for a first satellite in the constellation and determining a position vector for a second satellite in the constellation.

35. The method of claim 24, wherein determining an orientation of the constellation of satellites comprises determining an orientation angle vector for the constellation from a position vector for each of a satellite in the constellation and a satellite signal monitoring station.

36. The method of claim 35, wherein determining an orientation of the constellation of satellites further comprises determining the orientation angle vector for the constellation from a position vector of at least a second satellite and the position vector of the satellite signal monitoring station.

37. The method of claim 36, wherein determining the orientation of the constellation with respect to Earth further comprises forming a matrix of orientation angle vectors for the constellation including orientation angle vectors determined with reference to each of a plurality of satellites in the constellation.

38. The method of claim 24, wherein determining the orientation of the constellation comprises determining the orientation using only two satellite signal monitoring stations.

39. The method of claim 24, wherein determining the orientation of the constellation comprises determining the orientation using at least one mobile satellite signal monitoring station.

40. A method of determining an orbital location of a satellite in a constellation, the method comprising:
  determining a location of a first satellite in the constellation relative to a second satellite in the constellation;
  determining an orientation of the constellation relative to a reference using only two satellite signal monitoring stations; and
  transmitting orientation data to a satellite in the constellation.

41. A method of determining an orbital location of a satellite in a constellation, the method comprising:
  determining a location of a first satellite in the constellation relative to a second satellite in the constellation;
  determining an orientation of the constellation relative to a reference using only one satellite signal monitoring station; and
  transmitting orientation data to a satellite in the constellation.

42. A method of determining an orbital location of a satellite in a constellation, the method comprising:
  determining a location of a first satellite in the constellation relative to a second satellite in the constellation;
  determining an orientation of the constellation relative to a reference using only two satellite signal monitoring stations;
  determining satellite clocks relative to each other, determining a mean clock offset, and transmitting time offset data with the orientation data; and
  transmitting orientation data to a satellite in the constellation.

* * * * *

UNITED STATES PATENT AND TRADEMARK OFFICE
CERTIFICATE OF CORRECTION

PATENT NO. : 6,950,060 B1
APPLICATION NO. : 10/271932
DATED : September 27, 2005
INVENTOR(S) : Dale W. Klein It is certified that error appears in the above-identified patent and that said Letters Patent is hereby corrected as shown below:

Title Pg, Item (73) Assignee: General Dynamics C4 Systems, Inc. should be deleted.

Signed and Sealed this

Twenty-sixth Day of May, 2009

JOHN DOLL
*Acting Director of the United States Patent and Trademark Office*